(12) United States Patent
Sjödin et al.

(10) Patent No.: US 12,021,574 B2
(45) Date of Patent: Jun. 25, 2024

(54) CLASSIFICATION OF MICROWAVE LINK DATA

(71) Applicant: Telefonaktiebolaget LM Ericsson (publ), Stockholm (SE)

(72) Inventors: Martin Sjödin, Gothenburg (SE); Jonas Hansryd, Gothenburg (SE); Stefan Håkansson, Gothenburg (SE); Patrik Olesen, Floda (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/781,816

(22) PCT Filed: Dec. 9, 2019

(86) PCT No.: PCT/EP2019/084140
§ 371 (c)(1),
(2) Date: Jun. 2, 2022

(87) PCT Pub. No.: WO2021/115546
PCT Pub. Date: Jun. 17, 2021

(65) Prior Publication Data
US 2023/0006746 A1    Jan. 5, 2023

(51) Int. Cl.
*H04B 17/327* (2015.01)
*H04B 17/373* (2015.01)
(Continued)

(52) U.S. Cl.
CPC ......... *H04B 17/327* (2015.01); *H04B 17/373* (2015.01); *H04L 25/03949* (2013.01); *H04W 72/541* (2023.01)

(58) Field of Classification Search
None
See application file for complete search history.

(56) References Cited

U.S. PATENT DOCUMENTS 5,412,658 A * 5/1995 Arnold .................. H04W 16/14
                                                    455/67.11
10,993,120 B1 * 4/2021 Lekutai ................. H04W 24/02
(Continued)

FOREIGN PATENT DOCUMENTS

WO    2003034639 A1    4/2003
WO    2014023351 A1    2/2014
(Continued)

OTHER PUBLICATIONS

Huawei, "OptiX RTN 950 Radio Transport System Maintenance Guide", Issue 4, Dec. 30, 2017, pp. 1-10, V100R008C10, Huawei.
(Continued)

*Primary Examiner* — Duc T Duong
(74) *Attorney, Agent, or Firm* — COATS & BENNETT, PLLC (57) ABSTRACT

There is provided mechanisms for classifying microwave link data of a microwave system comprises a point-to-point wireless microwave link. A method is performed by a controller entity. The method comprises obtaining, in time windows, microwave link data in terms of signal quality measurement values and received power values for the point-to-point wireless microwave link. The method comprises classifying per time window, the microwave link data per time window to operating conditions in a set of operating conditions by, from the signal quality measurement values and received power values per time window, estimating probability values for each of the operating conditions according to a mapping, as learned through training, between pieces of microwave link data and operating conditions.

26 Claims, 5 Drawing Sheets

(51) Int. Cl.
*H04L 25/03* (2006.01)
*H04W 24/04* (2009.01)
*H04W 72/541* (2023.01)

(56) References Cited

U.S. PATENT DOCUMENTS

| | | | | |
|---|---|---|---|---|
| 2005/0075078 | A1* | 4/2005 | Makinen | H04L 47/2408 |
| | | | | 455/67.15 |
| 2013/0129341 | A1* | 5/2013 | D'Errico | H04B 10/1123 |
| | | | | 398/5 |
| 2015/0208260 | A1 | 7/2015 | Ahlqvist et al. | |
| 2015/0334750 | A1* | 11/2015 | Mehta | H04W 24/02 |
| | | | | 370/329 |
| 2017/0006579 | A1 | 1/2017 | Kikuma et al. | |
| 2017/0371074 | A1* | 12/2017 | Elkabetz | G01W 1/14 |
| 2020/0412417 | A1* | 12/2020 | Calzolari | H04W 52/245 |

FOREIGN PATENT DOCUMENTS

| | | |
|---|---|---|
| WO | 2017101984 A1 | 6/2017 |
| WO | 2019105557 A1 | 6/2019 |

OTHER PUBLICATIONS

Overeem, A. et al., "Measuring urban rainfall using microwave links from commercial cellular communication networks", Water Resources Research, vol. 47 No. W12505, Dec. 6, 2011, pp. 1-16, AGU.

* cited by examiner

CLASSIFICATION OF MICROWAVE LINK DATA

TECHNICAL FIELD

Embodiments presented herein relate to a method, a controller entity, a computer program, and a computer program product for classifying microwave link data of a microwave system comprising a point-to-point wireless microwave link.

BACKGROUND

In a microwave system digital information is sent over point-to-point wireless microwave links between two nodes. These two nodes are typically spaced from a few hundred meters up to several kilometers. Each node comprises link equipment, such as an antenna, a radio for frequency up- and down-conversion, and a modem for digital signal processing, used for transmission and reception of microwave signals over the point-to-point wireless microwave links.

Point-to-point wireless microwave links are sometimes subjected to disturbances. Such disturbances affect the received signal power and quality. This might trigger alarms that are sent to the network operator. When a network operator suspects that the link equipment is not working properly, a common response is to make a site visit (i.e., to send maintenance personnel to inspect the link equipment). Such a site visit sometimes results in the link equipment, or at least part thereof, being shipped back to the manufacturer for maintenance, or even replacement.

It has been found during inspections that a significant fraction of the link equipment sent back to the manufacturer in fact does not suffer from impaired operation and no faults are found. This indicates that resources, such as time and money, might be saved if network operators are provided with more accurate feedback about their network equipment.

In turn, it might be challenging to separate different types of operating conditions which cause the same type of performance degradation.

Hence, there is still a need for improved identification of the operating conditions of point-to-point wireless microwave links.

SUMMARY

An object of embodiments herein is to provide efficient identification of the operating conditions of point-to-point wireless microwave links.

According to a first aspect there is presented a method for classifying microwave link data of a microwave system comprising a point-to-point wireless microwave link. The method is performed by a controller entity. The method comprises obtaining, in time windows, microwave link data in terms of signal quality measurement values and received power values for the point-to-point wireless microwave link. The method comprises classifying per time window, the microwave link data per time window to operating conditions in a set of operating conditions by, from the signal quality measurement values and received power values per time window, estimating probability values for each of the operating conditions according to a mapping, as learned through training, between pieces of microwave link data and operating conditions.

According to a second aspect there is a controller entity for classifying microwave link data of a microwave system comprising a point-to-point wireless microwave link. The controller entity comprises processing circuitry. The processing circuitry is configured to cause the controller entity to obtain, in time windows, microwave link data in terms of signal quality measurement values and received power values for the point-to-point wireless microwave link. The processing circuitry is configured to cause the controller entity to classify, per time window, the microwave link data per time window to operating conditions in a set of operating conditions by, from the signal quality measurement values and received power values per time window, estimating probability values for each of the operating conditions according to a mapping, as learned through training, between pieces of microwave link data and operating conditions.

According to a third aspect there is presented a controller entity for classifying microwave link data of a microwave system comprising a point-to-point wireless microwave link. The controller entity comprises an obtain module configured to obtain, in time windows, microwave link data in terms of signal quality measurement values and received power values for the point-to-point wireless microwave link. The controller entity comprises a classify module configured to classify, per time window, the microwave link data per time window to operating conditions in a set of operating conditions by, from the signal quality measurement values and received power values per time window, estimating probability values for each of the operating conditions according to a mapping, as learned through training, between pieces of microwave link data and operating conditions.

According to a fourth aspect there is presented a computer program for classifying microwave link data of a microwave system comprising a point-to-point wireless microwave link, the computer program comprising computer program code which, when run on a controller entity, causes the controller entity to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously these aspects provide efficient identification of the operating conditions of the point-to-point wireless microwave links.

Advantageously these aspects will improve the accuracy of identifying the current classes of link operating conditions, since the risk of misclassifying these is reduced when other operating conditions are identified with greater accuracy.

Advantageously these aspects enable detection of interference from other microwave links, as well as detection of interference from other radio transmitters, such as military equipment.

Advantageously these aspects enable detection of whether the interference is in-band, out-of-band, or partly in-band.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
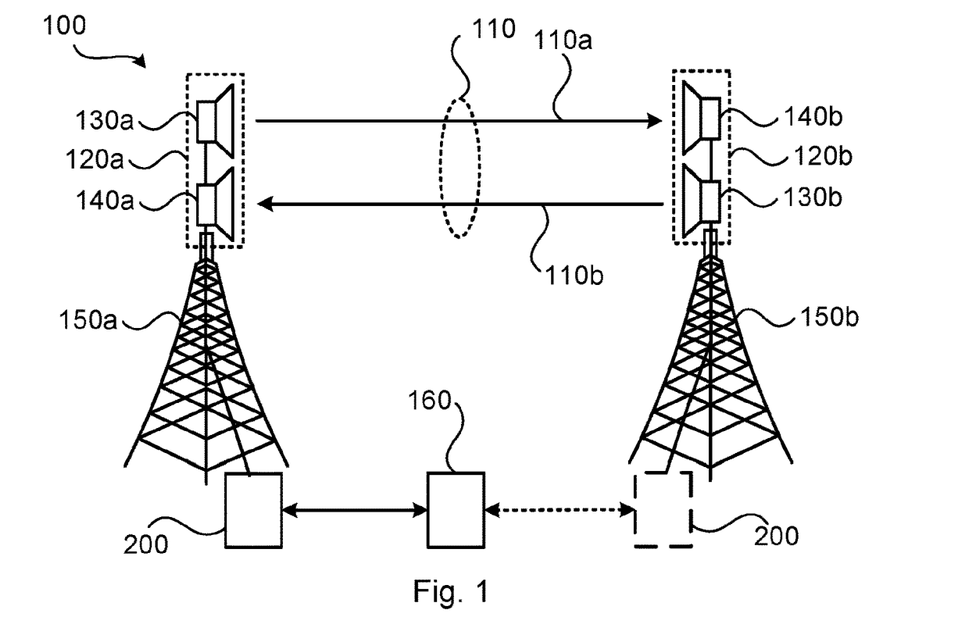
FIG. 1 is a schematic diagram illustrating a microwave system according to embodiments.

FIG. 1 is a schematic diagram illustrating a microwave system 100 where embodiments presented herein can be applied. The microwave system 100 comprises two nodes 120a, 120b configured to communicate with each other over point-to-point wireless microwave links 110, 110a, 110b. In turn, each node 120a, 120b comprises a microwave signal transmitter 130a, 130b configured for transmission of microwave link data in signals, and a microwave signal receiver 140a, 140b configured for reception of microwave link data in signals. Each node 120a, 120b might be part of a respective site 150a, 150b. Each site 150a, 150b is, via a controller entity 200, operatively connected to an operator entity 160. Further aspects of the controller entity 200 will be disclosed below.

The embodiments disclosed herein relate to mechanisms for classifying microwave link data of a microwave system 100 comprising a point-to-point wireless microwave link 110, 110a, 110b. In order to obtain such mechanisms there is provided a controller entity 200, a method performed by the controller entity 200, a computer program product comprising code, for example in the form of a computer program, that when run on a controller entity 200, causes the controller entity 200 to perform the method.

Operator entity 160 denotes, according to some aspects, an entity responsible for the actual operation of the microwave system 100, i.e. the entity responsible for taking action when the system's performance is not up to par. It can for example be an entity with which personnel in the network operating center (NOC) might interact, an entity running a computer program which in some examples is capable of employing machine learning techniques and/or handling traffic routing through the microwave system 100 or similar.

Figure 2:
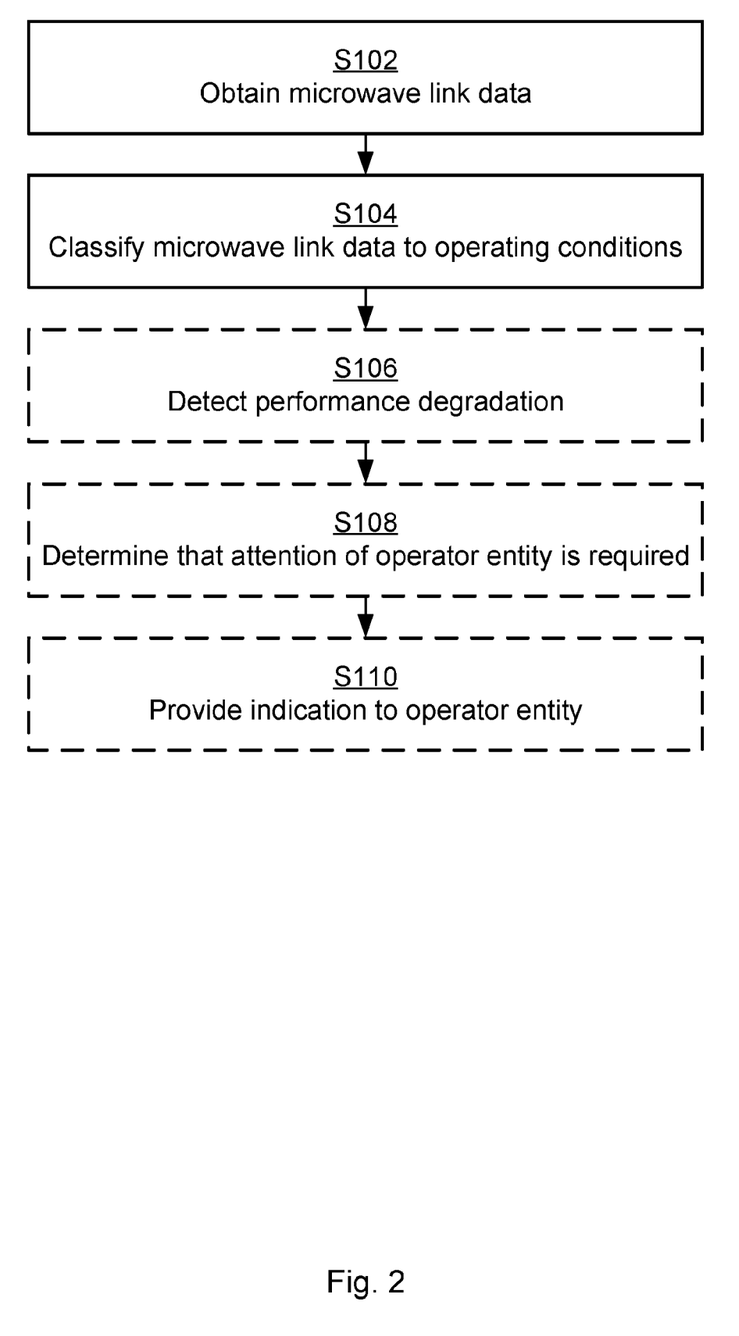
FIGS. 2 and 4 are flowcharts of methods according to embodiments.

FIG. 2 is a flowchart illustrating embodiments of methods for classifying microwave link data of a microwave system 100 comprising a point-to-point wireless microwave link 110, 110a, 110b.

The methods are performed by the controller entity 200. The methods are advantageously provided as computer programs 820.

Microwave data link values related to the operation and performance of a point-to-point wireless microwave link 110, 110a, 110b can be extracted from the microwave signal receivers 140a, 140b, the microwave signal transmitter 130a, 130b, or other radio equipment, in the nodes 120a, 120b. Examples of microwave link data are transmitted power level of the signal transmitted from a node, the received power of the signal received from another node, the mean-square error of the demodulated signal, the signal power before and after channel filtering, equalizer tap values, etc. In particular, the controller entity 200 is configured to perform step S102:

S102: The controller entity 200 obtains, in time windows, microwave link data in terms of signal quality measurement values and received power values for the point-to-point wireless microwave link 110, 110a, 110b.

The microwave link data is then, per each time window, classified to operating conditions. In particular, the controller entity 200 is configured to perform step S104:

S104: The controller entity 200 classifies, per time window, the microwave link data per time window to operating conditions in a set of operating conditions by, from the signal quality measurement values and received power values per time window, estimating probability values $\{p_k\}$ for each of the operating conditions according to a mapping $\{m_{jk}\}$, as learned through training, between pieces of microwave link data and operating conditions.

Advantageously this method provides efficient identification of the operating conditions of the point-to-point wireless microwave links 110, 110a, 110b.

Advantageously this method will improve the accuracy of identifying the current classes of link operating conditions, since the risk of misclassifying these is reduced when other operating conditions are identified with greater accuracy.

The training process for learning the mapping $\{m_{jk}\}$ is based on feeding large numbers of data examples representing different operating conditions to a classifier, as implemented by, or operatively connected to, the controller entity 200. Eventually the classifier learns to associate different input data patterns of the microwave link data with different operating conditions.

Training processes such as the one exemplified above are often referred to as "supervised learning" and are examples of well-known machine learning approaches. In another example, the mapping $\{m_{jk}\}$ can be learned through other machine learning approaches such as "reinforcement learning" or "unsupervised learning", or by any combination of supervised learning, reinforcement learning and unsupervised learning.

Figure 3:
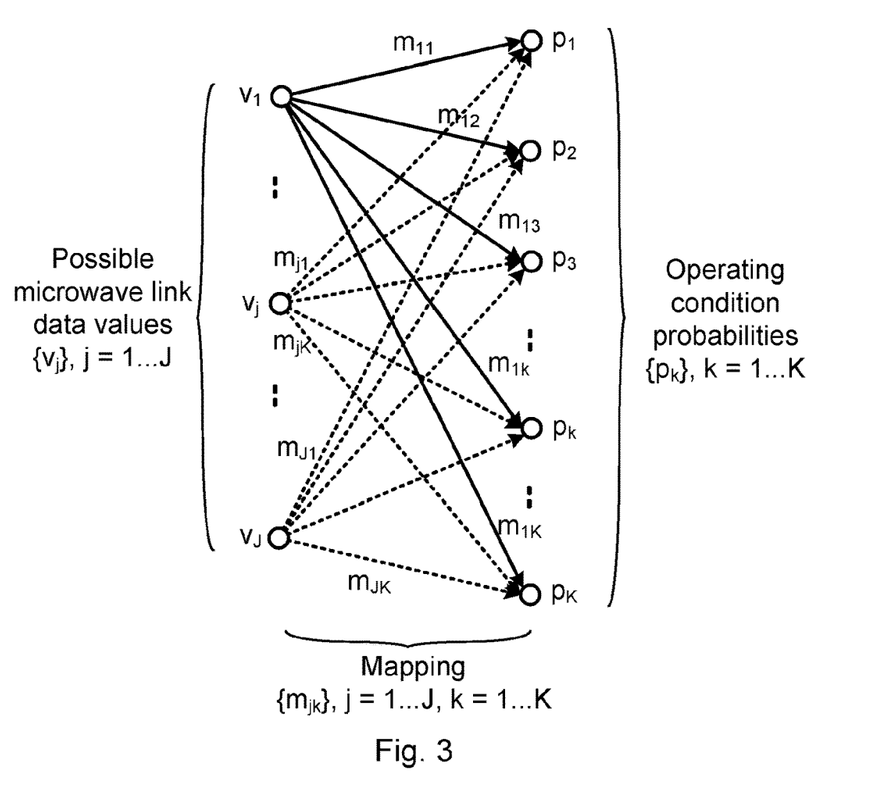
FIG. 3 schematically illustrates a mapping between microwave link data values and operating condition probabilities according to an embodiment.

FIG. 3 schematically illustrates a mapping $\{m_{jk}\}$ from J possible microwave link data values $\{v_j\}$, j=1 ... J, to K operating condition probability values $\{p_k\}$, k=1 ... K.

Embodiments relating to further details of classifying microwave link data of a microwave system 100 comprising a point-to-point wireless microwave link 110, 110a, 110b as performed by the controller entity 200 will now be disclosed.

As noted above, the microwave link data is obtained in time windows, i.e. the data comprises sequences of samples acquired within a given time interval. There could be different lengths of the time window. In some examples, each of the time windows has a length of at least 1 minute and up to one or more years, such as between 1 minute and 1 year, such as between 1 minute and 1 month, such as between 1 minute and 1 week, such as between 1 minute and 1 day, such as between 1 minute and 12 hours, such as between 1 hour and 6 hours. In each time window, the microwave link data might be sampled in the order of every 10 seconds. The microwave link data might thus be time series data that is sampled over 1 to 6 hours with 10 seconds resolution.

There could be different reasons for classifying the microwave link data. In some examples, the classifying in S104 is performed as part of network planning or network tuning of the microwave system 100.

There might be additional types of microwave link data that the controller entity 200 obtains in S102.

In some aspects, the microwave link data in the time windows further comprises transmitted power values for the point-to-point wireless microwave link 110, 110a, 110b. According to an embodiment, the microwave link data per time window is, according to the mapping $\{m_{jk}\}$, classified also from the transmitted power values in that time window.

In some aspects, one respective power attenuation value is determined from each pair of transmitted power value and received power value. It is understood that each pair of values contains values that are valid for the same point in time. According to an embodiment, the microwave link data per time window is, according to the mapping $\{m_{jk}\}$, classified from the power attenuation values.

In some aspects, the microwave link data in the time windows further comprises equalizer tap values for the point-to-point wireless microwave link 110, 110a, 110b. In general terms, equalizer tap values refer to the real and imaginary parts of the taps of the digital filter used in the receiver for channel equalization, i.e., the digital filter used to reverse the distortion introduced by the wireless channel affecting the wireless microwave link 110, 110a, 110b, the microwave signal receivers 140a, 140b, the microwave signal transmitter 130a, 130b, or other radio equipment, in the nodes 120a, 120b. According to an embodiment, the microwave link data per time window is, according to the mapping $\{m_{jk}\}$, classified also from the equalizer tap values in that time window.

Using one or more types of signal quality measures together with power attenuation values, or received power values, will enable the controller entity 200 to identify different types of operating conditions with higher accuracy.

Further aspects of the signal quality measurement values will now be disclosed.

There could be different ways to measure the signal quality measurement values. In some embodiments, the signal quality measurement values are measured after demodulation. In some embodiments, the signal quality measurement values are given in terms of mean squared error (MSE) or error vector magnitude (EVM). Further, in some aspects a comparison of signal power is made before and after the digital channel filter in the receiver. In particular, in some embodiments, respective received signal values are obtained both before channel filtering and after channel filtering.

In general terms, interference from other microwave sources implies that the operation of a point-to-point wireless microwave link 110, 110a, 110b is disturbed by unwanted signals with overlap in the spectral domain with the wanted signal from the other link node. Such conditions might be difficult, or even impossible, to recognize by only observing the received power or power attenuation. For example, the received power might be flat over time in the presence of an interferer, and the operating condition of the point-to-point wireless microwave link 110, 110a, 110b will hence appear as normal. On the other hand, even an interferer that is weak compared to the wanted signal might cause a visible degradation in terms of MSE.

According to an embodiment, at least one of the operating conditions in the set of operating conditions thus pertain to the point-to-point wireless microwave link 110, 110a, 110b being affected by interference. Advantageously this enables detection of interference from other microwave links, as well as detection of interference from other radio transmitters, such as military equipment. The interference is classified to be either in-band, partly in-band, or out-of-band. In the case of the point-to-point wireless microwave link 110, 110a, 110b being affected by interference, the controller entity 200 might be enabled to determine whether the interferer is in-band, out-of-band, or in between (i.e., partly in-band), by considering how much the received power has increased compared to during normal conditions, and how much power is removed by channel filtering. Advantageously this enables detection of whether the interference is in-band, out-of-band, or partly in-band. Further details relating thereto will now be disclosed.

When an interferer is fully in-band, the MSE will increase, and the equalizer response will not indicate any multipath, and the signal power before and after the channel filter will remain the same. Thus, according to an embodiment, the interference is classified to be in-band when the signal quality measurement values are degraded, and when, according to the equalizer tap values, there is no indication of multipath, and when the signal power values remain unchanged by the channel filtering.

When the interferer is partly in-band, the MSE will increase, the equalizer response will not indicate any multipath, and a fraction of the additional received power (due to the interferer) will be removed by the channel filter. Thus, according to an embodiment, the interference is classified to be partly in-band when the signal quality measurement values are degraded, and when, according to the equalizer tap values, there is no indication of multipath, and when the signal power values decrease after channel filtering.

When an interferer is fully out-of-band the MSE will be unchanged, the equalizer response will not indicate any multipath, and the measured signal power will drop after the channel filter. Thus, according to an embodiment, the interference is classified to be out-of-band when the signal quality measurement values remain unchanged, and when, according to the equalizer tap values, there is no indication of multipath, and when the signal power values decrease after channel filtering.

There could be different types, and different number, of operating conditions. According to an embodiment, there are at least three operating conditions in the set of operating conditions. One operating condition pertains to normal operation of the point-to-point wireless microwave link 110, 110a, 110b. At least two operating conditions pertain to performance degraded operation of the point-to-point wireless microwave link 110, 110a, 110b. Non-limiting illustrative examples of operating conditions and properties thereof are summarized next.

Normal operation: The transmission is not affected by any significant disturbances. The power attenuation, or received power, is essentially flat per each time window. The MSE is lower than (approximately) −35 dB, the signal power before and after digital channel filter in the receiver is the same, and the impulse response of the equalizer filter resembles a spike.

Rain: The signal is attenuated because of scattering from precipitation. The power attenuation is increased. The received power decreases if the transmitted power remains constant. If the transmitted power is increased in order to compensate for the increased power attenuation, the received power remains constant if enough transmit power is available to fully compensate for the increase in attenuation, or decreases if the transmitter can only partially compensate for the increase in attenuation. The MSE may be degraded depending on the received power. The signal power before and after channel filtering is the same, and the impulse response of the equalizer filter should resemble a spike.

Intermittent obstruction: Objects in the signal path cause additional attenuation. The power attenuation, or received power, is varying over time. The MSE may be degraded depending on the received power. The signal power before and after channel filtering is the same, and the impulse response of the equalizer filter should resemble a spike.

Multipath propagation: Power fluctuations occur due to interference when signal energy propagates along different paths between the microwave signal transmitter 130a, 130b and the microwave signal receiver 140a, 140b. The power attenuation, or received power, is varying over time. The attenuation might be reduced compared to during normal operating conditions, if the signals taking different paths interfere constructively in the microwave signal receiver 140a, 140b. The signal power before and after channel filtering is the same. The impulse response of the equalizer filter depends on the multipath conditions but will have a broader response compared to during normal conditions. The MSE might be degraded even if the signal power is sufficient to achieve good performance during normal conditions. If data from both transmission directions is included, it is highly likely that the operating conditions for both transmission directions are the same.

Maintenance: The link is down or at very low power for more than 5 minutes. The received power is reduced to comparatively very low levels for more than 5 minutes. Conversely, the power attenuation is increased to comparatively very high levels for more than 5 minutes.

Restart: The link is down or at very low power for less than 5 minutes. The received power is reduced to comparatively very low levels for less than 5 minutes. Conversely, the power attenuation is increased to comparatively very high levels for less than 5 minutes.

Mast sway: The received power fluctuates due to sway of the site 150a, 150b. The sway could be due to e.g. to wind load or mast bending due to heat. The power attenuation, or received power, is varying over time. The MSE might drop from its normal level depending on the received power. The signal power before and after channel filtering is the same, and the impulse response of the equalizer filter should resemble a spike.

Snow: The received power is reduced due to snow covering the microwave signal transmitter 130a, 130b and/or the microwave signal receiver 140a, 140b. The power attenuation, or received power, is varying over time. The MSE might drop from its normal level depending on the received power. The signal power before and after channel filtering is the same, and the impulse response of the equalizer filter should resemble a spike.

Vegetation: The received power is reduced due to season varying vegetation. Such as leaves or other type of foliage falling or snow covering trees or other types of foliage. The MSE might drop from its normal level depending on the received power.

Interference from other microwave links: The receive power should increase or be similar to that of normal operation. Conversely, the power attenuation should decrease or be similar to that of normal operation. The MSE increases from its normal level depending on the power and spectral content of the interfering signal. The signal power before and after channel filtering will be different if the interferer is located out-of-band or partly out-of-band. The equalizer response will resemble a spike. If data from both transmission directions is included, it is highly likely that the operating conditions are different from each other in the different transmission directions.

In some aspects, the point-to-point wireless microwave link 110 has a forward direction and a reverse direction. In the schematic illustration of FIG. 1, it is for illustrative purposes assumed that point-to-point wireless microwave link 110a is in the forward direction and that point-to-point wireless microwave link 110b is in the reverse direction. In some aspects the microwave link data is valid only for the forward direction. That is, according to an embodiment, the microwave link data as obtained is valid only for the forward direction, and the microwave link data is classified only for the forward direction. In some aspects the microwave link data is valid only for the reverse direction. That is, according to an embodiment, the microwave link data as obtained is valid only for the reverse direction, and wherein the microwave link data is classified only for the reverse direction. In some aspects the microwave link data is valid for the forward direction as well as for the reverse direction That is, according to an embodiment, separate pieces of the microwave link data are obtained for the forward direction and for the reverse direction, and the microwave link data is classified for both the forward direction and the reverse direction.

In some aspects, performance degradation reporting is performed based on the microwave link data of the microwave system 100. Hence, according to an embodiment, the controller entity 200 is configured to perform (optional) S106:

S106: The controller entity 200 detects performance degradation affecting data throughput in the microwave system 100. The performance degradation is detected by the controller entity 200 analysing performance data of the point-to-point wireless microwave link 110, 110a, 110b.

One issue is that if the microwave link data has been classified with high sensitivity and such classified microwave link data is used as operator feedback, there is a risk that large numbers of events that are not critical for the performance of the point-to-point wireless microwave link 110, 110a, 110b in the sense that events that do not affect data throughput are reported to the operator entity 160. On the other hand, if the sensitivity according to which the microwave link data is classified is too low, the ability to distinguish between different types of operating conditions is reduced. This tradeoff is circumvented by basing the operator feedback both on the classified microwave link data and performance data of the microwave system 100. The output from the classification in step S104 and the output of the performance detection in step S106 are used as input to step S108. In particular, the controller entity 200 is configured to perform S108:

S108: The controller entity 200 determines, by using the performance data and the cause of the performance degradation that attention from an operator entity 160 in the microwave system 100 is required. The cause is defined by the microwave link data as classified to the operating conditions.

Operator feedback is then provided only on a per need basis. In particular, the controller entity 200 is configured to perform S110:

S110: The controller entity 200 provides an indication to the operator entity 160 only when attention from the operator entity 160 is required, wherein the indication is an indication of the performance degradation and the cause of the performance degradation.

Figure 4:
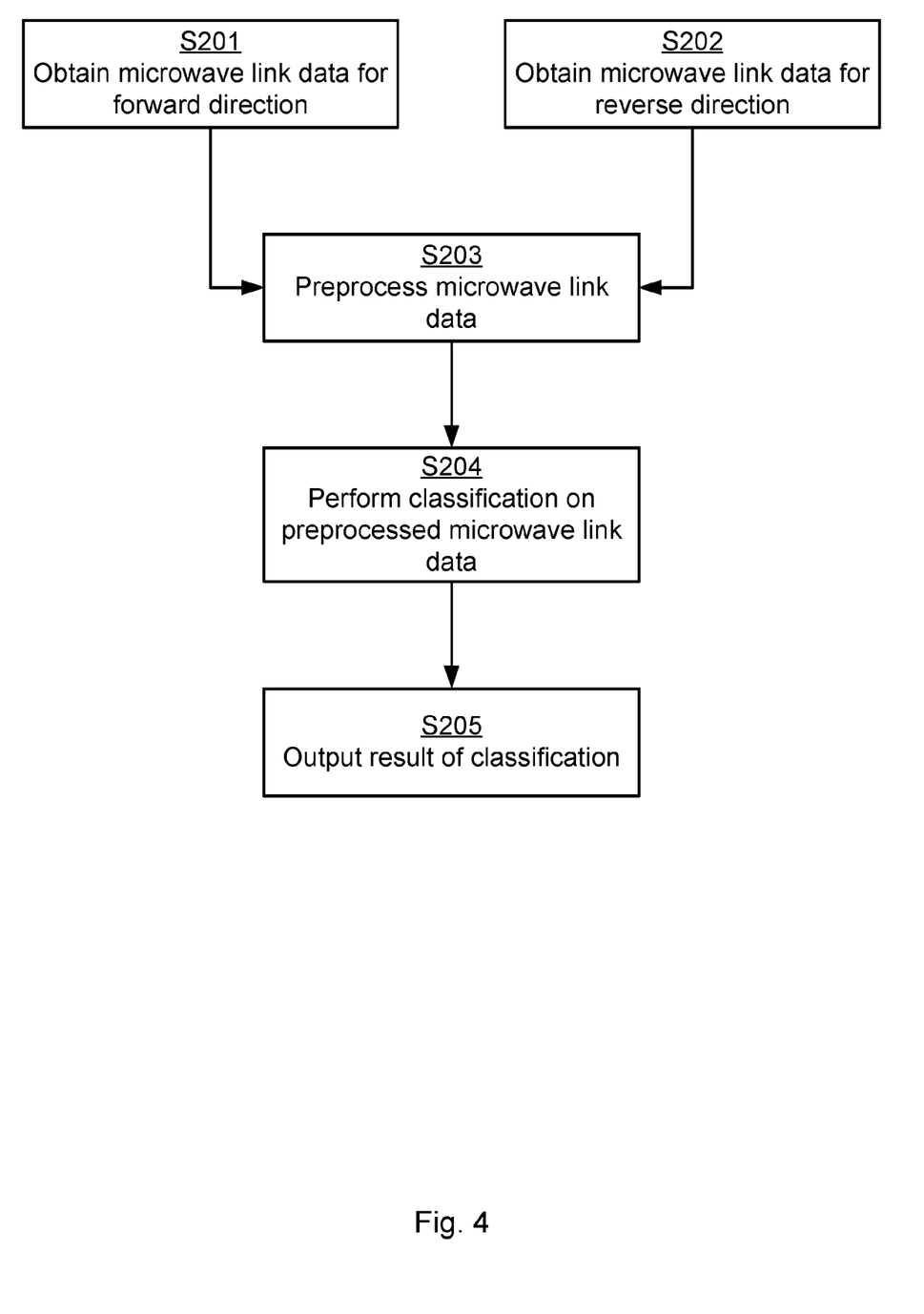

One particular embodiment of a method for classifying microwave link data of a microwave system 100 comprising a point-to-point wireless microwave link 110, 110a, 110b as performed by a controller entity 200 based on at least some of the above disclosed embodiments, aspects, and examples will now be disclosed with reference to the flowchart of FIG. 4.

S201, S202: Microwave link data from a point-to-point wireless microwave link 110, 110a, 110b is obtained. The data comprises samples of the transmitted power and the received power, respectively, samples of the MSE, samples of the signal power measured in the modem before and after channel filtering, and samples of the equalizer tap values. The microwave link data may be valid for either a single transmission direction of a link, such as only the forward direction, or both transmission directions.

S203: The microwave link data is preprocessed. The preprocessing of the microwave link data might comprise converting the samples of transmitted power and received power into samples of power attenuation (by at each time instant subtracting the value of received power from the value of transmitted power), and optionally to convert other data types into a more compact format. For example, not all the equalizer tap values need to be considered; only a single value representing the fraction of the signal energy located in the centermost part of the equalizers response might be used.

S204: Classification is performed for the thus preprocessed microwave link data. The classification is performed as in above disclosed step S104. The classification is thus performed according to a mapping $\{m_{jk}\}$, as learned through training, between pieces of microwave link data and the different operating conditions.

S205: The result of the classification in S204 is outputted. The classification output is the probability values $\{p_k\}$, k=1 . . . K for each of the operating conditions listed above.

Figure 5:
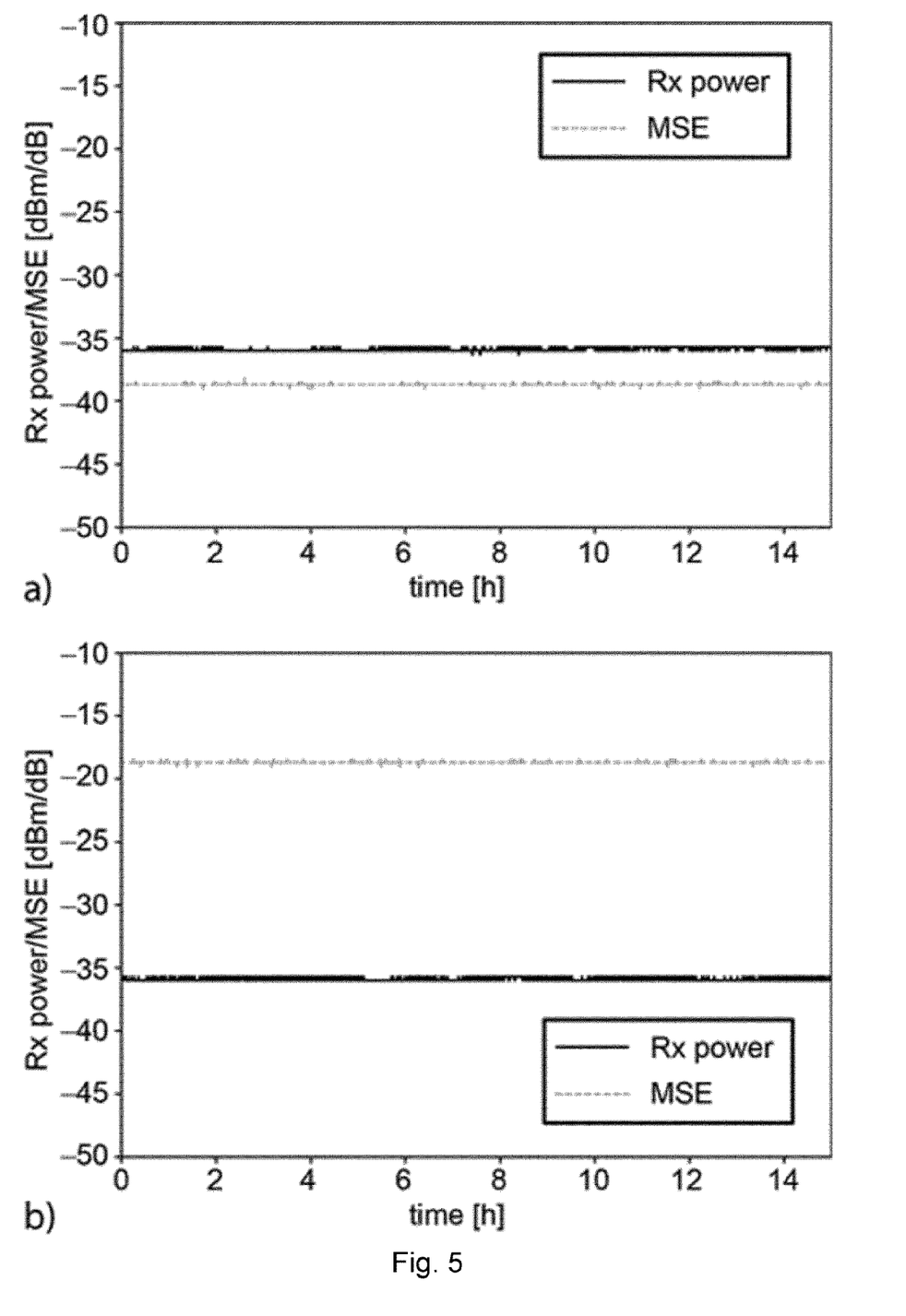
FIG. 5 illustrates simulation results according to embodiments.

FIG. 5a and FIG. 5b show received (Rx) power values and MSE for the same point-to-point wireless microwave link 110, 110a, 110b without and with an interferer present, respectively. FIG. 5a and FIG. 5b illustrate the benefits of simultaneous consideration of received power values and MSE when identifying whether an interferer is present or not.

Figure 6:
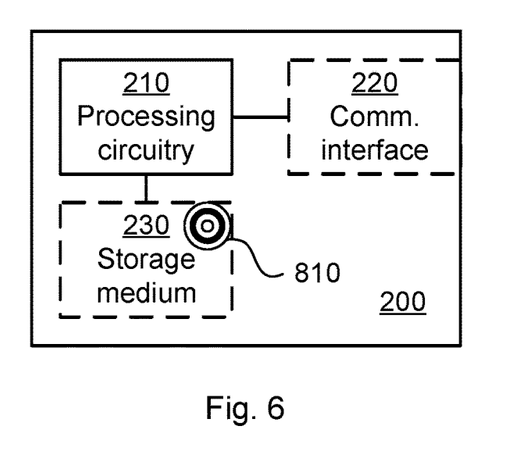
FIG. 6 is a schematic diagram showing functional units of a controller entity according to an embodiment.

FIG. 6 schematically illustrates, in terms of a number of functional units, the components of a controller entity 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 810 (as in FIG. 8), e.g. in the form of a storage medium 230. The processing circuitry 210 may further be provided as at least one application specific integrated circuit (ASIC), or field programmable gate array (FPGA).

Particularly, the processing circuitry 210 is configured to cause the controller entity 200 to perform a set of operations, or steps, as disclosed above. For example, the storage medium 230 may store the set of operations, and the processing circuitry 210 may be configured to retrieve the set of operations from the storage medium 230 to cause the controller entity 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The controller entity 200 may further comprise a communications interface 220 at least configured for communications with other entities, functions, nodes, and devices of the microwave system 100. As such the communications interface 220 may comprise one or more transmitters and receivers, comprising analogue and digital components. The processing circuitry 210 controls the general operation of the controller entity 200 e.g. by sending data and control signals to the communications interface 220 and the storage medium 230, by receiving data and reports from the communications interface 220, and by retrieving data and instructions from the storage medium 230. Other components, as well as the related functionality, of the controller entity 200 are omitted in order not to obscure the concepts presented herein.

Figure 7:
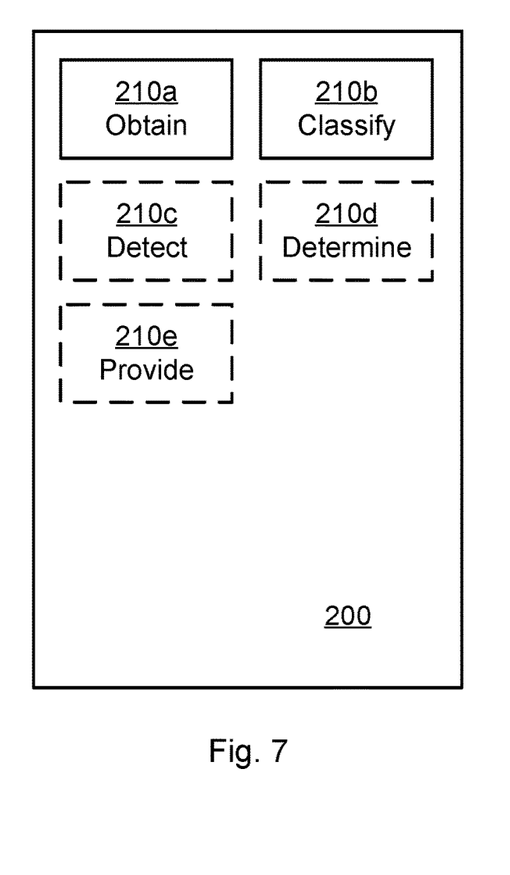
FIG. 7 is a schematic diagram showing functional modules of a controller entity according to an embodiment.

FIG. 7 schematically illustrates, in terms of a number of functional modules, the components of a controller entity 200 according to an embodiment. The controller entity 200 of FIG. 7 comprises a number of functional modules; an obtain module 210a configured to perform step S102, and a classify module 210b configured to perform step S104. The controller entity 200 of FIG. 7 may further comprise a number of optional functional modules, such as any of a detect module 210c configured to perform step S106, a determine module 210d configured to perform step S108, and a provide module 210e configured to perform step S110. In general terms, each functional module 210a-210e may in one embodiment be implemented only in hardware and in another embodiment with the help of software, i.e., the latter embodiment having computer program instructions stored on the storage medium 230 which when run on the processing circuitry makes the controller entity 200 perform the corresponding steps mentioned above in conjunction with FIG. 7. It should also be mentioned that even though the modules correspond to parts of a computer program, they do not need to be separate modules therein, but the way in which they are implemented in software is dependent on the programming language used. Preferably, one or more or all functional modules 210a-210e may be implemented by the processing circuitry 210, possibly in cooperation with the communications interface 220 and/or the storage medium 230. The processing circuitry 210 may thus be configured to from the storage medium 230 fetch instructions as provided by a functional module 210a-210e and to execute these instructions, thereby performing any steps as disclosed herein.

The controller entity 200 may be provided as a standalone device or as a part of at least one further device. For example, the controller entity 200 may be provided in one of the nodes 120a, 120b. Alternatively, functionality of the controller entity 200 may be distributed between at least two devices, or devices, or nodes. These at least two nodes, or devices, may either be part of the same network part or may be spread between at least two such network parts. According to some aspects the controller entity 200 is a logical function that can be implemented in either a more distributed fashion (e.g. co-located with the actual microwave transmitters and receivers) or in a more central fashion (e.g. in a data center).

Thus, a first portion of the instructions performed by the controller entity 200 may be executed in a first device, and a second portion of the of the instructions performed by the controller entity 200 may be executed in a second device; the herein disclosed embodiments are not limited to any particular number of devices on which the instructions performed by the controller entity 200 may be executed. Hence, the methods according to the herein disclosed embodiments are suitable to be performed by a controller entity 200 residing in a cloud computational environment. Therefore, although a single processing circuitry 210 is illustrated in FIG. 6 the processing circuitry 210 may be distributed among a plurality of devices, or nodes. The same applies to the functional modules 210a-210e of FIG. 7 and the computer program 820 of FIG. 8.

Figure 8:
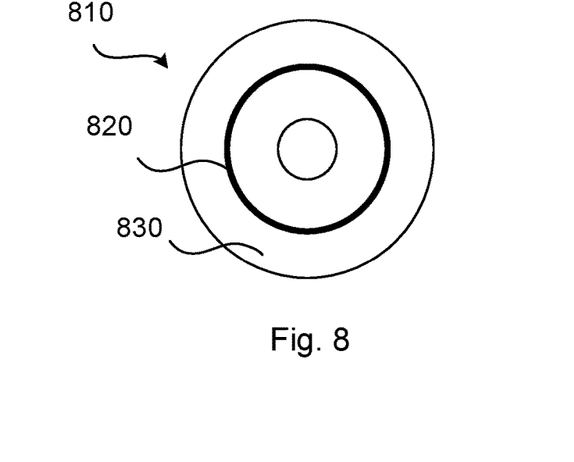
FIG. 8 shows one example of a computer program product comprising computer readable storage medium according to an embodiment.

FIG. 8 shows one example of a computer program product 810 comprising computer readable storage medium 830. On this computer readable storage medium 830, a computer program 820 can be stored, which computer program 820 can cause the processing circuitry 210 and thereto operatively coupled entities and devices, such as the communications interface 220 and the storage medium 230, to execute methods according to embodiments described herein. The computer program 820 and/or computer program product 810 may thus provide means for performing any steps as herein disclosed.

In the example of FIG. 8, the computer program product 810 is illustrated as an optical disc, such as a CD (compact disc) or a DVD (digital versatile disc) or a Blu-Ray disc. The computer program product 810 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 820 is here schematically shown as a track on the depicted optical disk, the computer program 820 can be stored in any way which is suitable for the computer program product 810.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method, performed by controller circuitry, for classifying microwave link data of a microwave system comprising a point-to-point wireless microwave link, the method comprising:
    obtaining, in time windows, microwave link data in terms of signal quality measurement values and received power values for the point-to-point wireless microwave link; and
    classifying, per time window, the microwave link data per time window to operating conditions in a set of operating conditions by, from the signal quality measurement values and received power values per time window, estimating probability values for each of the operating conditions according to a mapping, as learned through training, between pieces of microwave link data and operating conditions.

2. The method of claim 1:
    wherein the microwave link data in the time windows further comprises transmitted power values for the point-to-point wireless microwave link; and
    wherein the microwave link data per time window, according to the mapping, is classified also from the transmitted power values in that time window.

3. The method of claim 2:
    wherein one respective power attenuation value is determined from each pair of transmitted power value and received power value; and
    wherein the microwave link data per time window, according to the mapping, is classified from the respective power attenuation values.

4. The method of claim 1:
    wherein the microwave link data in the time windows further comprises equalizer tap values for the point-to-point wireless microwave link; and
    wherein the microwave link data per time window, according to the mapping, is classified also from the equalizer tap values in that time window.

5. The method of claim 4:
    wherein at least one of the operating conditions in the set of operating conditions pertain to the point-to-point wireless microwave link being affected by interference; and
    wherein the interference is classified to be either in-band, partly in-band, or out-of-band.

6. The method of claim 5, wherein the interference is classified to be in-band:
    when the signal quality measurement values are degraded; and
    when there is no indication of multipath according to the equalizer tap values; and
    when the signal power values remain unchanged by the channel filtering.

7. The method of claim 5, wherein the interference is classified to be partly in-band:
    when the signal quality measurement values are degraded; and
    when there is no indication of multipath according to the equalizer tap values; and
    when the signal power values decrease after channel filtering.

8. The method of claim 5, wherein the interference is classified to be out-of-band:
    when the signal quality measurement values remain unchanged; and
    when according to the equalizer tap values, there is no indication of multipath; and
    when the signal power values decrease after channel filtering.

9. The method of claim 1, wherein the signal quality measurement values are measured after demodulation.

10. The method of claim 1, wherein the signal quality measurement values are given in terms of mean squared error (MSE) or error vector magnitude (EVM).

11. The method of claim 1, wherein respective signal power values are obtained both before channel filtering and after channel filtering.

12. The method of claim 1:
wherein there are at least three operating conditions in the set of operating conditions;
wherein one operating condition pertaining to normal operation of the point-to-point wireless microwave link; and
wherein at least two operating conditions pertaining to performance degraded operation of the point-to-point wireless microwave link.

13. The method of claim 1:
wherein the point-to-point wireless microwave link has a forward direction and a reverse direction; and
wherein the microwave link data as obtained is valid only for the forward direction; and
wherein the microwave link data is classified only for the forward direction.

14. The method of claim 1:
wherein the point-to-point wireless microwave link has a forward direction and a reverse direction; and
wherein the microwave link data as obtained is valid only for the reverse direction, and wherein the microwave link data is classified only for the reverse direction.

15. The method of claim 1:
wherein point-to-point wireless microwave link has a forward direction and a reverse direction;
wherein separate pieces of the microwave link data are obtained for the forward direction and for the reverse direction; and
wherein the microwave link data is classified for both the forward direction and the reverse direction.

16. The method of claim 1, wherein each of the time windows has a length of between 1 minute and 12 hours, such as between 1 hour and 6 hours.

17. The method of claim 1, wherein the classifying is performed as part of network planning or network tuning of the microwave system.

18. The method of claim 1, further comprising:
detecting performance degradation affecting data throughput in the microwave system by analyzing performance data of the point-to-point wireless microwave link;
determining, by using the performance data and cause of the performance degradation that attention from an operator entity in the microwave system is required, the cause being defined by the microwave link data as classified to the operating conditions; and
providing an indication to the operator entity only when attention from the operator entity is required, wherein the indication is an indication of the performance degradation and the cause of the performance degradation.

19. Controller circuitry for classifying microwave link data of a microwave system comprising a point-to-point wireless microwave link, the controller circuitry comprising processing circuitry, the processing circuitry being configured to cause the controller circuitry to:
obtain, in time windows, microwave link data in terms of signal quality measurement values and received power values for the point-to-point wireless microwave link; and
classify, per time window, the microwave link data per time window to operating conditions in a set of operating conditions by, from the signal quality measurement values and received power values per time window, estimating probability values for each of the operating conditions according to a mapping, as learned through training, between pieces of microwave link data and operating conditions.

20. The controller circuitry of claim 19:
wherein the microwave link data in the time windows further comprises transmitted power values for the point-to-point wireless microwave link; and
wherein the microwave link data per time window, according to the mapping, is classified also from the transmitted power values in that time window.

21. The controller circuitry of claim 19:
wherein the microwave link data in the time windows further comprises equalizer tap values for the point-to-point wireless microwave link; and
wherein the microwave link data per time window, according to the mapping, is classified also from the equalizer tap values in that time window.

22. The controller circuitry of claim 19, wherein the processing circuitry is further configured to cause the controller circuitry to:
detect performance degradation affecting data throughput in the microwave system by analyzing performance data of the point-to-point wireless microwave link;
determine, by using the performance data and cause of the performance degradation that attention from an operator entity in the microwave system is required, the cause being defined by the microwave link data as classified to the operating conditions; and
provide an indication to the operator entity only when attention from the operator entity is required, wherein the indication is an indication of the performance degradation and the cause of the performance degradation.

23. A non-transitory computer-readable storage medium for classifying microwave link data of a microwave system comprising a point-to-point wireless microwave link, containing a computer program comprising executable instructions that, when executed by a processing circuit of a controller circuitry, causes the controller circuitry to:
obtain, in time windows, microwave link data in terms of signal quality measurement values and received power values for the point-to-point wireless microwave link; and
classify, per time window, the microwave link data per time window to operating conditions in a set of operating conditions by, from the signal quality measurement values and received power values per time window, estimating probability values for each of the operating conditions according to a mapping, as learned through training, between pieces of microwave link data and operating conditions.

24. The non-transitory computer-readable storage medium of claim 23:
wherein the microwave link data in the time windows further comprises transmitted power values for the point-to-point wireless microwave link; and
wherein the microwave link data per time window, according to the mapping, is classified also from the transmitted power values in that time window.

25. The non-transitory computer-readable storage medium of claim 23:
wherein the microwave link data in the time windows further comprises equalizer tap values for the point-to-point wireless microwave link; and wherein the microwave link data per time window, according to the mapping, is classified also from the equalizer tap values in that time window.

26. The non-transitory computer-readable storage medium of claim 23, wherein the executable instructions, when executed by the processing circuit of the controller circuitry, further causes the controller circuitry to:
- detect performance degradation affecting data throughput in the microwave system by analyzing performance data of the point-to-point wireless microwave link;
- determine, by using the performance data and cause of the performance degradation that attention from an operator entity in the microwave system is required, the cause being defined by the microwave link data as classified to the operating conditions; and
- provide an indication to the operator entity only when attention from the operator entity is required, wherein the indication is an indication of the performance degradation and the cause of the performance degradation.

* * * * *